March 5, 1940.  K. H. KARLSEN  2,192,609

REVERSE LOCK

Filed April 26, 1938

INVENTOR
Karl H. Karlsen
BY
ATTORNEY

Patented Mar. 5, 1940

2,192,609

UNITED STATES PATENT OFFICE 2,192,609

REVERSE LOCK

Karl Henry Karlsen, Endicott, N. Y., assignor to International Business Machines Corporation, New York, N. Y., a corporation of New York Application April 26, 1938, Serial No. 204,319

4 Claims. (Cl. 188—81)

This invention relates to uni-directional motion devices and, more particularly, to an extremely simple and highly efficient reversing lock mechanism.

The main object of the present invention resides in the provision of a gripping element adapted to permit a relative movement of two members in one direction and effective to grip automatically one of said members upon an attempted relative movement of the said members in a reverse direction.

The reversing lock mechanism comprises two members adapted to be rotated relatively to each other, one of said members provided with a disk element and the other member provided with a pivoted pawl member having engaging surfaces adapted to engage the surface of said disk element so that upon relative movement of the members in one direction the engaging surfaces are ineffective to impart a positive gripping effect on said members, but upon attempted relative movement of the members in the reverse direction the engaging surfaces are effective automatically to engage positively the surface of said disk so as not to permit any degree of relative movement of the members in said reverse direction.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

Figure 1:
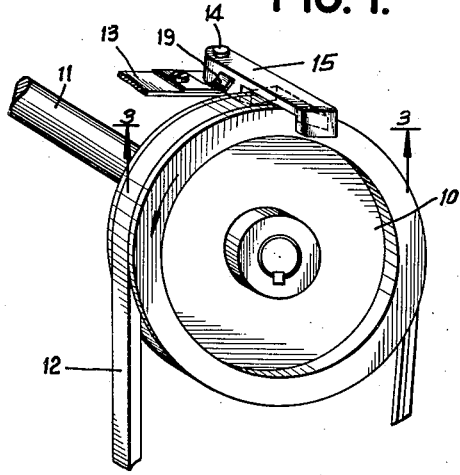
Fig. 1 is a perspective view showing the reverse lock, forming part of the invention, as applied to a pulley.
Figure 2:
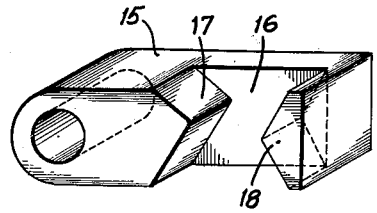
Fig. 2 is an enlarged detail view of said reverse lock.

In the form of the invention shown in Fig. 1, the reverse lock is applied, for purposes of disclosure, to a pulley, although it is understood that it may be applied as well to any other movable or rotatable member such as a disk, gear, slide or the like.

Specifically, in Fig. 1, pulley 10 is keyed to a shaft 11 and is driven normally in the direction indicated by the arrow by any suitable means such as drive belt 12. Adjacent to the pulley is a fixed bracket 13 on which is pivotally mounted, by means of a pivot stud 14, the reverse movement preventing detent, pawl, or lock 15. The pawl is pivoted in this manner so as to be capable of movement along a plane substantially perpendicular to the sides or faces of the rim of the pulley.

Figure 3:
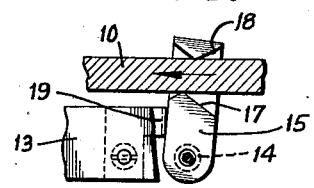
Fig. 3 is a sectional view taken along lines 3—3 of Fig. 1.

Pawl 15 is formed with a notch 16 open at the bottom of the pawl and into which the rim of the pulley projects. With this arrangement, the inner end wall 17 of the notch faces one side of the pulley rim and the outer end wall 18 faces the other side of the pulley rim. The outer end wall 18 comprises a pair of beveled edges converging toward the confronting side of the pulley rim and having a meeting or apex line forming an engaging surface for the adjacent side of the pulley rim. The inner end wall 17 comprises a pair of beveled edges converging towards the confronting side of the pulley rim and having a meeting or apex line forming an engaging surface for the adjacent side of the pulley rim. Thus, the two walls 17 and 18 provide engaging surfaces straddling the sides of the pulley. The apexes or engaging surfaces of the opposite end walls 17 and 18 lie along different radii, and a line drawn through points of said apexes, with reference to Fig. 3, extends along an incline to a perpendicular drawn to the sides of the pulley rim. Considering the displacement of this apex-joining line during pivotal movement of the pawl, as the latter swings to the left (Fig. 3), said line would approach more nearly a perpendicular position relative to the sides of the pulley rim, thereby providing a greater distance in the direction of the width of the pulley rim between the apexes of the inner and outer walls 17 and 18 for the pulley to move between. Consequently, with the pulley moving in the direction indicated in Fig. 3, the tendency of the pulley is to rock the pawl to the left, which, as explained above, tends to free the sides of the pulley from the apexes of walls 17 and 18. For this reason, then, the pulley may freely move with respect to the pawl in the direction indicated in Fig. 3. In order to tend to restore the pawl to a normal position when the pulley stops rotating in the aforesaid direction, a flat spring 19 acts on the pawl urging the latter to the right to maintain the position shown in Fig. 3. In this position of the pawl, a line joining points along the apexes of its walls 17 and 18 is at such an angle relative to the sides of the pulley rim that any tendency of the latter to rotate in a reverse direction causes the component of the apex-joining line in the direction of the width of the pulley to tend to become shorter. The tendency of this component to shorten effects a jamming action of the walls 17 and 18 on the pulley, thereby locking the pulley against such reverse rotation. It may be noted that the pawl, as normally positioned by spring 19, has its engaging walls 17 and 18 in intimate contact with the sides of the pulley rim, instantaneously ready to lock the pulley when its direction of rotation attempts to reverse.

In order to insure the equalization of the locking action of the walls 16 and 17 of the pawl with respect to pulley 10 or any other driven member, it is advantageous to have a slight amount of clearance between pawl 15 and its pivot stud 14. Thus, should the apex of one engaging wall of the pawl engage before the apex of the other wall, a slight longitudinal motion of the pawl is caused by such engagement, enabling the pawl to rock slightly further in a locking direction until the apexes of both walls engage the opposite sides of the pulley with equal force and effect.

Figure 4:
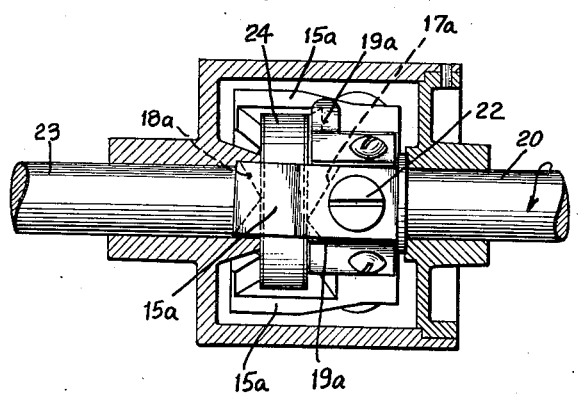
Fig. 4 is a section through the casing of an over-running clutch employing the aforesaid reverse locks.
Figure 5:
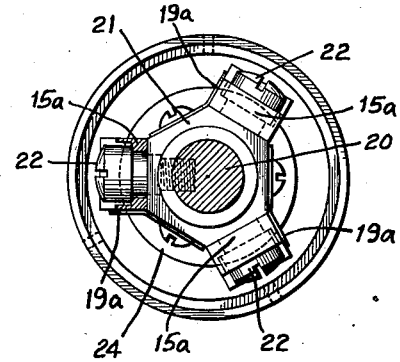
Fig. 5 is an end view of the clutch of Fig. 4.

The reverse lock may be also utilized in the mechanism of simple but efficient over-running clutch of the type such as shown in Figs. 4 and 5 and may be mounted on either the drive or the driven clutch member. Specifically, in the clutch disclosed in the drawing, three locking pawls 15a are pivotally fastened to a hexagonal hub 21 by any suitable means, such as pivot screws 22, which also secure hub 21 to one extremity of a drive shaft 20. The pawls 15a are arranged so as to engage a circular disk 24 fixed to one end of a shaft 23 which is to be driven through the clutch connection by drive shaft 20. Flat springs 19a hold the pawls in their normal positions which are slightly inclined from a perpendicular to the faces of the disk 24. The action of each of these pawls is similar to the action of pawl 15 which has been previously described. The pawls are spaced equally around the periphery of the disk to provide an equalized thrust of the pawls with respect to the disk.

During rotation of shaft 20 in the direction indicated by the arrow in Fig. 4, the apexes of the beveled surfaces 17a and 18a of the pawls engage the opposite faces of disk 24 and prevent reverse rotation of the disk relative to shaft 20. In this manner, the pawls constrain the driven shaft 23 to rotate with the drive shaft 20 in the indicated direction. The pawls, however, permit the driven shaft to rotate relative to the drive shaft in the same direction which it is being driven in. Thus, if drive shaft 20 suddenly decelerates or stops altogether, disk 24 is instantaneously released from the grip of pawls 15a so that shaft 23 may run ahead of shaft 20 under its own momentum. The locking principle of the pawls 15a with respect to disk 24 is the same as that already explained in detail for the application of the single reverse lock 14 to the pulley 10 or any other drive member. In the over-running clutching device, however, the reverse lock pawls rotate with one of the clutch elements and the relative direction of rotation between the two clutch elements is the factor which is being controlled.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Coupling means for a rotatable drive shaft and a rotatable driven shaft, comprising a housing provided with a bearing at each end thereof, the drive shaft extending through one of said bearings into the housing and having its extremity within the housing formed into the shape of a lug, the driven shaft extending through the other of said bearings into the housing and having its extremity within the housing formed into the shape of a circular disc with flat sides, a series of pawls pivotally mounted at spaced intervals around the periphery of the lug each provided with a pair of spaced walls consisting of a pair of beveled faces joining in an apex adapted to engage on its adjacent flat side of the disc, means to position the pawls along lines substantially parallel to the common axis of rotation of the shafts so that the apexes of said pawls then lie along lines inclined to said parallel lines, the pawls tending upon rotation of the drive shaft in one direction to cause said inclined lines to become more inclined thereby to lock the engaged disc to the lug for common rotation in the housing bearings in said direction, and said pawls tending upon resultant relative rotation between the shafts in the opposite direction to rock relative to the engaged disc to bring the inclined lines to a less inclined position so as to release the grip of the apexes on the disc and render the driven shaft capable of rotating in its bearing in said opposite direction ahead of the drive shaft.

2. A device for preventing retrograde movement of a rotatable disc, comprising a locking pawl having a pair of spaced engaging areas each consisting of a pair of beveled faces meeting in an apex line intermediate the edges of the pawl and each adapted to engage a different one of a pair of spaced surfaces of the disc, a pivotal support for mounting said pawl for operation substantially along a line through the center of the pivot point perpendicular to the spaced surfaces of the disc, biasing means for locating said pawl so as to maintain each apex in contact with its related surface of the disc, thereby causing said apexes to be slightly removed from the perpendicular line and on opposite sides thereof, the pawl upon attempted retrograde movement of the disc tending to move so as to move its apexes in an arc toward the related surfaces of the disc so as to provide a cramping action to lock the disc against such movement, and the pawl upon attempted movement of the disc in the normal direction tending to move so as to move its apexes in an arc away from said related surfaces of the disc to permit free rotation of the disc in said normal direction.

3. A device for preventing retrograde movement of a rotatable disc, comprising a locking pawl having a pair of spaced walls each consisting of a pair of beveled faces joining in an apex intermediate the edges of the pawl and each adapted to engage a different confronting surface of the disc, a pivotal support for mounting said pawl for operation substantially along a line through the center of the pivot point parallel to the axis of rotation of the disc, biasing means for locating said pawl so as to maintain the apexes in contact with the confronting surfaces of the disc, thereby causing the apexes to be slightly removed from the parallel line and on opposite sides thereof, the pawl upon attempted retrograde movement of the disc tending to move so that the apex nearer the pivot point of the pawl tends to move in an arc toward the parallel line and hence into one of the confronting surfaces of the disc and the apex more removed from the pivot point tends to move away from said parallel line and hence into another confronting surface of the disc to provide a cramping action sufficient to lock the disc against such movement, and the pawl upon attempted rotation of the disc in the normal direction tending to move so that the respective apexes move in opposite directions and away from locking engagement with the surfaces of the disc to permit free rotation of the disc in said normal direction.

4. A unidirectional motion device for a pair of rotatable members, comprising a locking pawl pivotally carried by one of said members having a pair of spaced engaging areas consisting of a pair of beveled faces meeting in an apex line intermediate the edges of the pawl, means for mounting said members so that each of the apexes of the pawl of said one member engages a different one of a pair of spaced surfaces on the other member and the pawl is substantially in alignment with a line through the center of its pivot point on the one member perpendicular to the spaced surfaces of the second mentioned member, means for yieldingly locating said pawl so as to maintain the apexes of the pawl in contact with the related surfaces of said second member and slightly removed from the perpendicular line on opposite sides thereof, the pawl upon attempted relative movement between the members in one direction tending to move so as to move the apexes in an arc toward the related surfaces of the second member to cause a jamming action to lock the members against such relative movement, and the pawl upon attempted relative movement in the other direction tending to move so as to move the apexes away from the related surfaces of said second member to permit free relative movement in the latter direction.

KARL HENRY KARLSEN.